No. 844,269. PATENTED FEB. 12, 1907.
H. S. ELLIOTT.
VEHICLE SHAFT SUPPORT.
APPLICATION FILED JAN. 29, 1906.
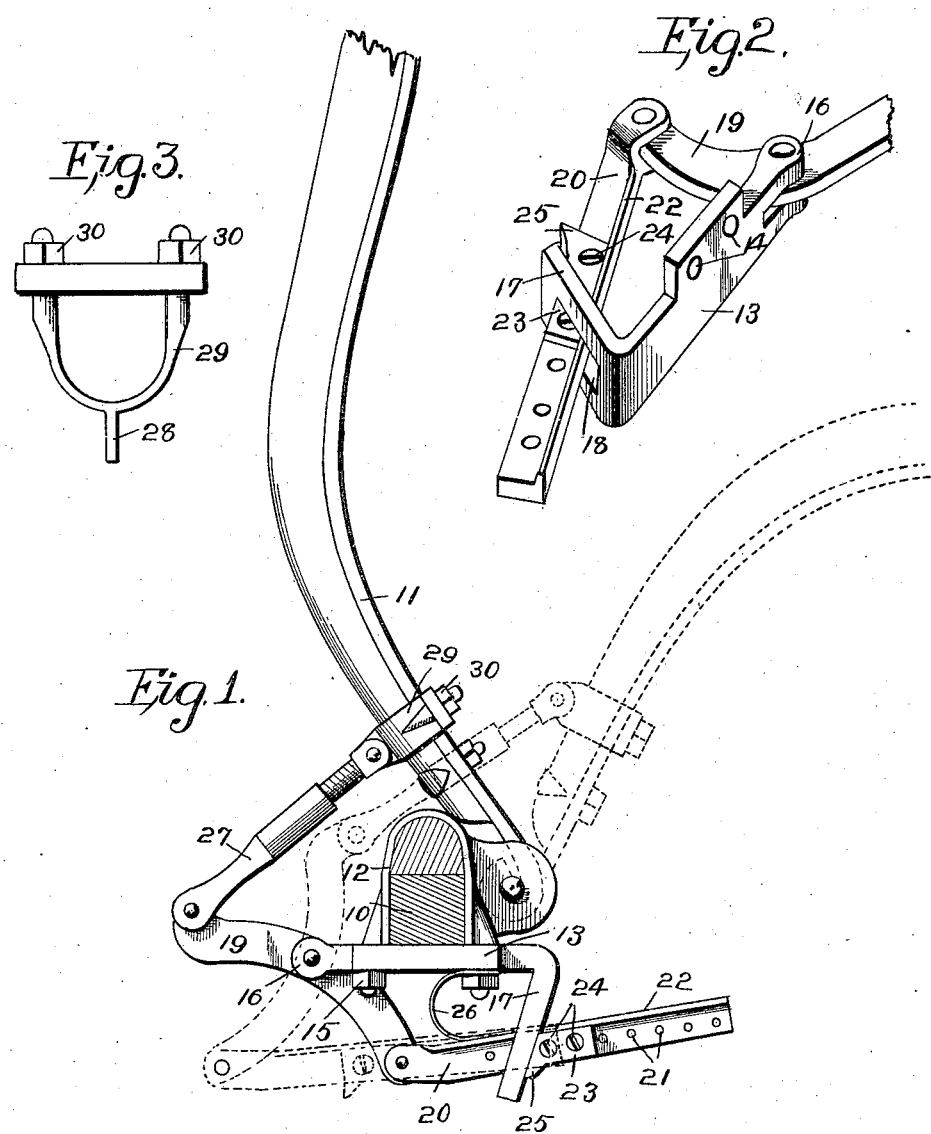
Witnesses
A. G. Hague
J. B. Smutney
Inventor H. S. Elliott
by Oung & Caus attys

UNITED STATES PATENT OFFICE.

HARRY S. ELLIOTT, OF JEFFERSON, IOWA.

VEHICLE-SHAFT SUPPORT.

No. 844,269.  Specification of Letters Patent.  Patented Feb. 12, 1907.

Application filed January 29, 1906. Serial No. 298,332.

*To all whom it may concern:*

Be it known that I, HARRY S. ELLIOTT, a citizen of the United States, residing at Jefferson, in the county of Greene and State of Iowa, have invented a certain new and useful Vehicle-Shaft Support, of which the following is a specification.

The object of my invention is to provide a device of simple, durable, and inexpensive construction in the nature of an attachment to be applied to the front axle of the vehicle and to automatically hold the shafts in an elevated position after they have been placed therein by the operator.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a side elevation of a portion of a shaft connected with a vehicle-axle and having my invention applied thereto supporting the shaft in an upright position. The dotted lines in said figure show the normal position of the shaft and the corresponding portions of the movable parts of the attachment. Fig. 2 shows a detail perspective view of a device embodying my invention with the link for connecting the lever with the shaft omitted. Fig. 3 shows a side elevation of the clip to be attached to the vehicle-shaft.

Referring to the accompanying drawings, I have used the reference-numeral 10 to indicate the front axle of the vehicle, and 11 a vehicle-shaft hinged thereto. The numeral 12 indicates a clip of ordinary form on the said axle.

My attachment comprises a supporting-bracket formed with a body portion 13, provided with two openings 14, designed to receive the screw-threaded projections of the clip 12 and to be held by said clip against the bottom of the axle by the nuts 15. On one end of the bracket 13 is a slotted extension 16, and on the other end is an arm 17, projecting downwardly and formed with an angular opening 18. In the slotted extension 16 I have fulcrumed a lever 19, to the lower end of which I have pivoted an arm 20. This arm is provided with a series of perforations 21 and with a flange 22 at its top. The arm projects through the opening 18, which forms a guide for it. Adjustably mounted on the arm 20 is a lug or stop 23, secured to the arm 20 by the bolts 24, which may be passed through any of the openings 21. This stop 23 is provided with a downward projection 25 at its rear end, the slot 18 being of such length as to permit both the arm 20 and stop 23 to pass through it. The numeral 26 indicates a spring fixed at one end by means of one of the nuts 15 and having its other end engaging the top of the arm 20 to exert the yielding pressure downwardly on said arm.

Pivoted to the upper end of lever 19 is a link 27, capable of longitudinal adjustment and pivoted to a lug 28 on a clip 29, which clip is secured to the shaft 11 above its pivotal point by means of the nuts 30.

In practical use, and assuming the parts to be in the position shown by solid lines in Fig. 1, it is obvious that the shaft is firmly held in its upright position by means of my attachment. The stop 23 prevents rearward movement of the arm 20 by its engagement with the part 17, and the shaft 11 cannot swing forwardly unless the arm 20 can move rearwardly. Assuming, further, that the operator desires to lower the shaft, he grasps the lower end of the arm 20 and elevates it against the pressure of spring 26 far enough to prevent the stop 23 to pass through the opening 18, whereupon the shaft may swing forwardly and downwardly.

My attachment does not in any way interfere with the ordinary use of the shafts, and whenever the operator elevates the shaft the arm 20 moves forwardly through the slot 18 until the stop 23 engages the part 17. Then the forward end of the arm 20 will be elevated by the stop 23 and against the pressure of the spring 26 until the stop passes through the slot 18. Then the spring 26 will throw the arm 20 downwardly and the stop will engage the forward face of the parts 17, and thus lock the shaft in its upright position.

The device may be quickly and easily adjusted to shafts of various sizes and shapes by moving the stop 23 relative to the arm 20 and also by adjusting the length of link 27.

The device may also be used on a vehicle-pole.

Having thus described my invention, what I claim, and desire to secure by Letters Patent of the United States therefor, is—

1. In a device of the class described, the combination of a lever, a link for connecting the lever to a shaft and a latch device for automatically locking the lever in position when the shaft is elevated.

2. In a device of the class described, the combination of a support to be connected to a vehicle-axle, a lever fulcrumed to said support, a link pivoted to the lever, means for connecting the link to a shaft, an arm pivoted to the other end of the lever, and a latch device for automatically securing the arm to the said support when the shaft is elevated.

3. In a device of the class described, the combination of a support to be connected to a vehicle-axle, a lever fulcrumed to said support, a link pivoted to the lever, means for connecting the link to a shaft, an arm pivoted to the other end of the lever, and spring-actuated latch device for automatically securing the arm to the said support when the shaft is elevated.

4. In a device of the class described, the combination of a support to be secured to a vehicle-axle, an extension on said support, an arm slidingly mounted relative to the extension and provided with a stop to engage the extension and prevent rearward movement of the arm, a lever fulcrumed to the extension and pivoted to said arm and a link pivoted to the other end of the arm and designed to be attached to a shaft.

5. In a device of the class described, the combination of a support to be secured to a vehicle-axle, an extension on said support, an arm slidingly mounted relative to the extension and provided with a stop to engage the extension and prevent rearward movement of the arm, a lever fulcrumed to the extension and pivoted to said arm, a link pivoted to the other end of the arm and designed to be attached to a shaft and a spring for yieldingly holding the arm in position with its lug engaging the extension.

6. In a device of the class described, the combination of a support to be secured to a vehicle-axle, an extension on said support, an arm slidingly mounted relative to the extension and provided with an adjustable stop to engage the extension and prevent rearward movement of the arm, a lever fulcrumed to the extension and pivoted to said arm, and a link pivoted to the other end of the arm and designed to be attached to a shaft.

7. The combination of a support to be secured to a vehicle-axle and formed with an extension at its forward end projecting downwardly and rearwardly and provided with an opening, an arm extended through said opening, a stop adjustably mounted on said arm and formed with a projection at its rear lower point, a spring secured to the support to provide a yielding pressure downwardly upon said arm, said lug and arm so shaped that the arm may be moved forwardly through the opening and when the lug passes beyond the opening the arm will be forced downwardly by the spring to position with the lug engaging the front of the extension on the support, a lever fulcrumed to the rear end of the support, a link longitudinally adjustable pivoted to the upper end of the lever and a clip to be attached to a shaft pivotally connected with the said link.

8. In a device of the class described, the combination of a lever, a link for connecting the lever to a shaft, and a latch device for locking the lever in position when the shaft is elevated.

9. In a device of the class described, the combination of a lever, a link for connecting the lever to a shaft, and a device for automatically locking the lever in position when the shaft is elevated.

HARRY S. ELLIOTT.

Witnesses:
L. S. ELLIOTT,
BERT B. KING.